(No Model.)
A. E. SCOTT.
SEED PLANTER.
No. 318,311.  Patented May 19, 1885.
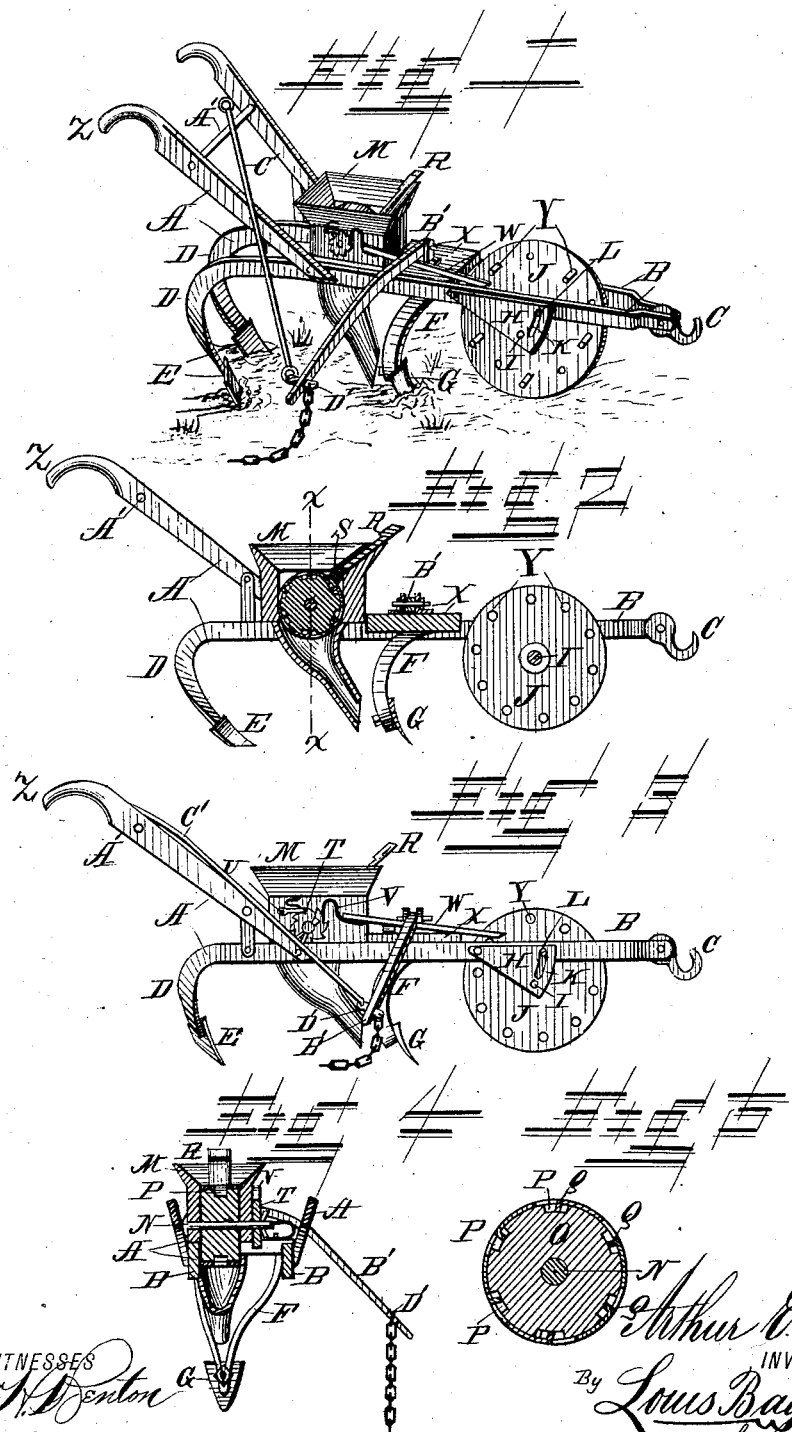
WITNESSES
Arthur E. Scott,
INVENTOR
By Louis Bagger & Co.
his Attorneys.

UNITED STATES PATENT OFFICE.

ARTHUR EUGENE SCOTT, OF LONE GROVE, TEXAS.

SEED-PLANTER.

SPECIFICATION forming part of Letters Patent No. 318,311, dated May 19, 1885.

Application filed January 27, 1885. (No model.)

*To all whom it may concern:*

Be it known that I, A. E. SCOTT, of Lone Grove, in the county of Llano and State of Texas, have invented certain new and useful Improvements in Seed-Planters; and I do hereby declare that the following is a full, clear and exact description of the invention, which will enable others skilled in the art to which it appertains to make and use the same, reference being had to the accompanying drawings, which form a part of this specification, and in which—

Figure 1 is a perspective view of my improved seed-planter, showing the same complete and in position for operation. Fig. 2 is a longitudinal vertical sectional view of the same. Fig. 3 is a side view. Fig. 4 is a vertical transverse sectional view taken on the line $x$ $x$ in Fig. 2; and Fig. 5 is a detail sectional view on a larger scale of the seeding-wheel detached from the planter.

The same letters refer to the same parts in all the figures.

This invention relates to seed-planters; and it has for its object to provide a planter of simple, convenient, and inexpensive construction, which shall be light, durable, easy to manage, and by means of which various kinds of seed may be successfully planted. With these ends in view the invention consists in the improved construction and arrangement of parts, which will be hereinafter fully described, and particularly pointed out in the claims.

In the drawings hereto annexed, A designates the frame of the machine, which consists of two metallic beams, B B, bolted together at the front end, where they are provided with a clevis, C, for the attachment of the draft, and curved downward at their rear ends to form standards D D, carrying the coverers E E. A forked standard, F, is bolted between the beams B B, and provided with the furrow-opener G.

To the outer sides of the beams B B are pivoted a pair of triangular plates, H H, the free ends of which have bearings for the axle I of the transporting and operating wheel J, and segmental slots K for the set-screws L, which are inserted into the beams B, and which enable the plates H to be adjusted so as to raise or lower the wheel in relation to the frame, thereby adjusting the draft and causing the machine to run deep or shallow, as may be required.

M designates the seed-box, which is secured to the frame-beams B B by means of brackets or other suitable devices, and which is provided with bearings for a transverse shaft, N, carrying the seed-wheel O, which consists, as shown in Fig. 5, of a disk the periphery of which is provided with a series of recesses, P, adapted to receive the seed. The said disk is provided with an annular band or tire of sheet metal, having a series of down-struck tongues, Q Q, fitting in the recesses P P, and adapted, by simply moving the annular band, to be slid forward or backward in the said recesses, thereby regulating the size of the same and enabling them to receive such a quantity of seed as may be desired. The front end of the seed-box is provided with a slide, R, the lower end of which has a cut-off, S, consisting of a brush or of a flap of leather or other flexible material, which, as the seed-wheel revolves, serves to cut off the seed from the openings in the said seed-wheel.

The shaft N of the seed-wheel is provided at one of its outer ends with a ratchet-wheel, T, engaging a stop-pawl, U, attached to the side of the seed-box and adapted to be operated by a spring-pawl, V, inverted-U-shaped, and secured to the rear end of a lever, W, which is pivoted upon a platform, X, secured to the frame of the machine in front of the seed-box. The front end of the said lever is engaged and operated by a series of studs, Y Y, secured to and extending laterally from the operating wheel or disk, the shape or distance between the operations of the dropping mechanism being regulated by the number of and the distance between the said studs, and the downwardly-projecting free end of the U-shaped spring V will slip over the pawls, when the rear end of the lever W is raised, while it will engage the teeth of the ratchet-wheel when it is depressed and revolve it.

The rear end of the frame is provided with handles Z Z, suitably connected to the said frame and connected by a round, A'. B' is a lever pivoted upon the platform X, and adapted to be reversed by the operator of the machine by means of a handle, C', which, while not in use, rests upon the round connecting the handles. The outer or front end of the handle C' is connected to one end of a slide, D', adjustable upon the lever B', and the other end of which is provided with a ring, E', to which may be attached a chain or the like, adapted, when the machine is in operation, to drag upon the ground, and thus to make a mark to indicate the furrow in which the machine is next to follow.

From the foregoing description, taken in connection with the drawings hereto annexed, the invention and its advantages will be readily understood. It is simple in construction, durable, and efficient in operation.

I am aware that seed-disks in seeding-machines have been made having an adjustable plate provided with an inwardly-bent tongue forming an adjustable wall in the seed-cup in the wheel, and I do not wish to claim such construction broadly; but I am not aware that a seed-wheel having a number of seed-cups or recesses has been provided with an annular band or tire having slots corresponding to the cups and formed with inwardly-bent tongues, each forming an adjustable wall for each seed-cup, which band or tire may be adjusted so as to adjust the size of all the seed-cups simultaneously; and I therefore claim—

In a seed-planter, the combination of the seed wheel or disk having a series of seed cups or recesses in its periphery with a band or tire fitting upon the periphery of the disk having slots registering with the recesses and provided at one end of each slot with an inwardly-bent tongue forming an adjustable wall for each recess, as and for the purpose shown and set forth.

In testimony that I claim the foregoing as my own I have hereunto affixed my signature in presence of two witnesses.

ARTHUR EUGENE SCOTT.

Witnesses:
SAMUEL DOUGLAS FOOTE,
WILLIAM LEMUEL ROGERS.